US012187991B2

(12) United States Patent
Meyer et al.

(10) Patent No.: US 12,187,991 B2
(45) Date of Patent: Jan. 7, 2025

(54) APPARATUS AND METHOD FOR MODIFYING A RESPONSIVE LIQUID HELD IN A LIQUID CONTAINER HAVING RESONANT FREQUENCIES IN THE AUDIO FREQUENCY RANGE

(71) Applicant: Meyer Sound Laboratories, Incorporated, Berkeley, CA (US)

(72) Inventors: John D. Meyer, Berkeley, CA (US); Katrin M. Rawks, El Cerrito, CA (US); Jon Arneson, Napa, CA (US); Paul Kohut, Richmond, CA (US); Roger Schwenke, Alameda, CA (US); Pei-Yuan Liu, Albany, CA (US); Carlo Zuccatti, Berkeley, CA (US)

(73) Assignee: Meyer Sound Laboratories, Incorporated, Berkeley, CA (US)

( * ) Notice: Subject to any disclaimer, the term of this patent is extended or adjusted under 35 U.S.C. 154(b) by 929 days.

(21) Appl. No.: 16/679,079

(22) Filed: Nov. 8, 2019

(65) Prior Publication Data

US 2020/0071645 A1  Mar. 5, 2020

Related U.S. Application Data

(63) Continuation of application No. 16/555,378, filed on Aug. 29, 2019, now abandoned.
(Continued)

(51) Int. Cl.
*C12H 1/22* (2006.01)
*C12H 1/06* (2006.01)
(Continued)

(52) U.S. Cl.
CPC ............ *C12H 1/16* (2013.01); *C12H 1/06* (2013.01); *C12H 1/22* (2013.01); *H04R 1/22* (2013.01); *C12G 1/062* (2013.01)

(58) Field of Classification Search
CPC ... C12H 1/06; C12H 1/00; C12H 1/22; C12G 1/062; C12G 1/06; C12G 1/00; C12G 1/22
(Continued)

(56) References Cited

U.S. PATENT DOCUMENTS 2,086,891 A    7/1937  Bachmann et al.
4,554,477 A *  11/1985 Ratcliff ............... B06B 1/0284
                                                  318/116
(Continued)

FOREIGN PATENT DOCUMENTS

CN   103205355 A    7/2013
EP   0336262 A1   10/1989
(Continued)

OTHER PUBLICATIONS

International Searching Authority, International Search Report/International Application No. PCT/US20/59225, Jun. 3, 2021.
(Continued)

*Primary Examiner* — Reginald Alexander
(74) *Attorney, Agent, or Firm* — Beeson Skinner Beverly, LLP (57) ABSTRACT

An apparatus for modifying a responsive liquid held in a barrel or other liquid container includes a transducer for producing vibration energy within the audio frequency range in response to an audio signal input and a coupler affixed to the transducer such that vibration energy produced in the transducer is transferred to the coupling device. The coupling device has a pusher end that extends beyond the front plane of the transducer and that contacts and pushes against the barrel wall when the apparatus is tied to the barrel wall. By determining the resonances of the liquid-filled barrel, audio input signals having sufficiently high levels at determined resonant frequencies can be chosen to achieve a (Continued)

maximum response in the liquid contained in the barrel. The apparatus is particularly suited for the sonic aging of whisky.

18 Claims, 11 Drawing Sheets

Related U.S. Application Data (60) Provisional application No. 62/724,558, filed on Aug. 29, 2018.

(51) Int. Cl.
*C12H 1/16* (2006.01)
*H04R 1/22* (2006.01)
*C12G 1/06* (2019.01)

(58) Field of Classification Search
USPC .......................................................... 99/277.1
See application file for complete search history.

(56) References Cited

U.S. PATENT DOCUMENTS

| | | | |
|---|---|---|---|
| 5,173,318 A | 12/1992 | Leu et al. | |
| 5,305,737 A * | 4/1994 | Vago | B08B 3/12 601/4 |
| 5,534,076 A * | 7/1996 | Bran | H01L 21/67057 134/1 |
| 5,909,741 A * | 6/1999 | Ferrell | B08B 3/12 134/1 |
| 6,538,360 B2 * | 3/2003 | Puskas | B06B 1/0269 310/316.01 |
| 7,063,867 B2 | 6/2006 | Tyler, III et al. | |
| 7,101,691 B2 | 9/2006 | Kinley et al. | |
| 7,198,809 B2 * | 4/2007 | Leonhardt | C12H 1/165 426/15 |
| 10,087,406 B2 * | 10/2018 | Bailey | C12H 1/06 |
| 2005/0054958 A1 | 3/2005 | Hoffmann | |
| 2006/0165855 A1 | 7/2006 | Leonhardt et al. | |
| 2007/0057388 A1 | 3/2007 | McCabe | |
| 2007/0120701 A1 | 5/2007 | Teller | |
| 2007/0209520 A1 * | 9/2007 | Ho | C12H 1/16 99/275 |
| 2008/0141702 A1 | 6/2008 | Gagliano et al. | |
| 2014/0000460 A1 | 1/2014 | Buttiker et al. | |
| 2017/0369831 A1 | 12/2017 | Dhesi et al. | |
| 2018/0051240 A1 | 2/2018 | Au | |

FOREIGN PATENT DOCUMENTS

| | | |
|---|---|---|
| FR | 3035119 B1 | 10/2016 |
| JP | 3007847 B2 | 2/1998 |
| JP | 2006034116 A | 2/2006 |
| KR | 100799373 B1 | 2/2008 |
| WO | 2017153618 | 9/2017 |

OTHER PUBLICATIONS

Quartz; https://qz.com/907619/the-many-scientific-ways-to-age-whiskey-many-years-in-just-a-few-days/Article titled "The scientific tricks that can age whisky in days instead of years."; Akshat; Feb. 12, 2017.

Mother Jones; https://www.motherjones.com/food/2017/09/the-outlandish-things-people-will-do-to-change-whiskeys-flavor/; Jena Luna; Sep. 16, 2017.

The Press Democrat; http://www.pressdemocrat.com/lifestyle/7200055-181/in-sebastopol-spirit-works-distillery; Christi Warren; Aug. 10, 2017.

* cited by examiner

APPARATUS AND METHOD FOR MODIFYING A RESPONSIVE LIQUID HELD IN A LIQUID CONTAINER HAVING RESONANT FREQUENCIES IN THE AUDIO FREQUENCY RANGE

CROSS-REFERENCE TO RELATED APPLICATIONS

This is a continuation of U.S. Non-Provisional application Ser. No. 16/555,378 filed Aug. 29, 2019, which application claims the benefit of U.S. Provisional Patent Application No. 62/724,558 filed Aug. 29, 2018. Both of the aforementioned applications are incorporated herein by reference.

BACKGROUND

The present invention relates to the process for modifying a liquid contained in a liquid container where the liquid is responsive to vibration energy introduced into the liquid; the invention more particularly relates to apparatuses and processes that introduce sonic energy into the liquid for purposes of achieving a desired change in the liquid in a relatively short period of time. The invention has particular application in accelerating the aging of alcoholic beverages stored in wood barrels or casks, such as whisky or wine.

Alcoholic beverages, and particularly whisky spirits and wine, are traditionally aged in wood barrels or casks, a process that changes the character of the beverage over time, giving it a more desirable quality and taste. Aging is the final stage of a spirit or wine making process. It allows the beverage to "mature" and is sometimes said to provide a "finish" to the beverage. However characterized, aging contributes to the beverage's final distinctive character, including its color and taste.

Because proper aging of whisky or wine can take years, different methods have been proposed for speeding up the physical and chemical changes that underlie the aging process. These include subjecting the in-barrel liquid to ultrasonic vibrations and blasting the barrel with audible sound, including music. In either case the object is to agitate the beverage inside the barrel to hasten the physical and chemical processes needed to accelerate aging. The difficulty with these sonic approaches is that introducing energy in the ultrasonic frequency ranges causes cavitation in the in-barrel liquid that is detrimental to the maturation process of spirits or wine (or other in-barrel liquid), while in the lower audio frequency ranges, particularly in low audio frequency ranges where barrel resonances are found, it is difficult to get enough acoustic energy into the liquid in the barrel to have any appreciable effect on the aging process.

The present invention overcomes difficulties with sonic aging processes heretofore proposed by providing an apparatus and method for efficiently coupling vibration energy in the audio frequency range, and particularly in a range of about 20 Hz to about 1000 Hz, into an in-barrel liquid that is responsive to the agitation produced by this vibration energy. By operating in these lower frequency ranges, the apparatus and method of the invention avoids the problems of cavitation that produce undesirable end results. The apparatus and method of the invention are capable of introducing effective amounts of vibration energy into a volume of whisky, wine or other agitation responsive liquid contained in a barrel for effectively accelerating the aging of the liquid. The apparatus and method of the invention are further capable of achieving accelerated aging of a barrel liquid with a limited amount of equipment and with relatively small external power requirements.

SUMMARY OF THE INVENTION

The invention is directed to an apparatus for modifying a liquid held in a liquid container having container walls wherein the liquid is responsive to vibration energy introduced into the liquid and wherein the container has determinable resonant frequencies in the audio frequency range. The apparatus includes a transducer capable of producing vibration energy within the audio frequency range in response to a signal input. A coupling device or simply "coupler" having a projecting pusher end is affixed to the transducer such that vibration energy produced in the transducer transfers to the coupling device. Attachment means are provided for holding the transducer next to a wall of the liquid container such that the pusher end of the coupling device affixed to the transducer pushes against the wall of the liquid container, and such that vibration energy produced by the transducer at a resonant frequency of the liquid container is efficiently transmitted through the container wall to the responsive liquid in the container.

The method of the invention involves first determining the frequency response and thereby the resonances of the barrel with the vibration responsive liquid contained in the barrel, and then directly coupling to the barrel vibration energy using audio signals containing the frequencies based on this determined barrel resonances. Direct coupling could be achieved by direct physical contact or an indirect contact by which vibration energy is transmitted directly to the barrel's container wall.

The method of the invention extends to a method of enhancing the quality of an alcoholic beverage contained in a barrel, and most suitably a wood barrel, comprising the steps of i) selecting a transducer capable of producing acoustic energy within a sonic frequency range, ii) mounting the transducer to the outside of a barrel containing the liquid alcoholic beverage to be aged such that acoustic energy produced by the transducer is transmitted to the barrel, iii) positioning at least one sensor to detect pressure fluctuations or acceleration changes indicating agitation in the liquid alcoholic beverage in the barrel when the transducer mounted to the barrel is energized at different frequencies, the sensor having sensor outputs, iv) from the sensor outputs determining the resonant frequency or frequencies of the barrel within the sonic frequency range of the transducer, and v) driving the transducer with a signal containing a sufficient amount of acoustic energy at the determined resonant frequency or frequencies of the barrel to provoke a resonance or resonances in the barrel which enhance agitation of the alcoholic beverage in the barrel.

DESCRIPTION OF THE ILLUSTRATED EMBODIMENTS

The embodiments of the invention described herein are directed to accelerating the aging of whisky or other alcoholic beverages stored in a barrel. It will, however, be appreciated that the invention is not intended to be limited to such uses. The apparatus and methods described can as well be used to modify a liquid contained in a liquid container, including containers other than a barrel, where the liquid is responsive to vibration energy introduced into the liquid.

Referring now to the drawings, FIGS. 1-4 show a barrel 11 for containing an alcoholic beverage, not seen, having a curved sidewall 15 and flat barrel end walls 17. The barrel is oriented horizontally such that the barrel end walls are in a vertical plane and the curved barrel sidewalls extend in the direction of the horizontal axis of the barrel, which is denoted by the letter X in FIG. 2. While other barrel orientations can be used, this orientation allows for below-described advantageous placement of the transducer used to agitate the liquid in the barrel. The in-barrel liquid can be whisky, but other vibration responsive liquids, such as wine, could be processed in the barrel as herein described.

Figure 1:
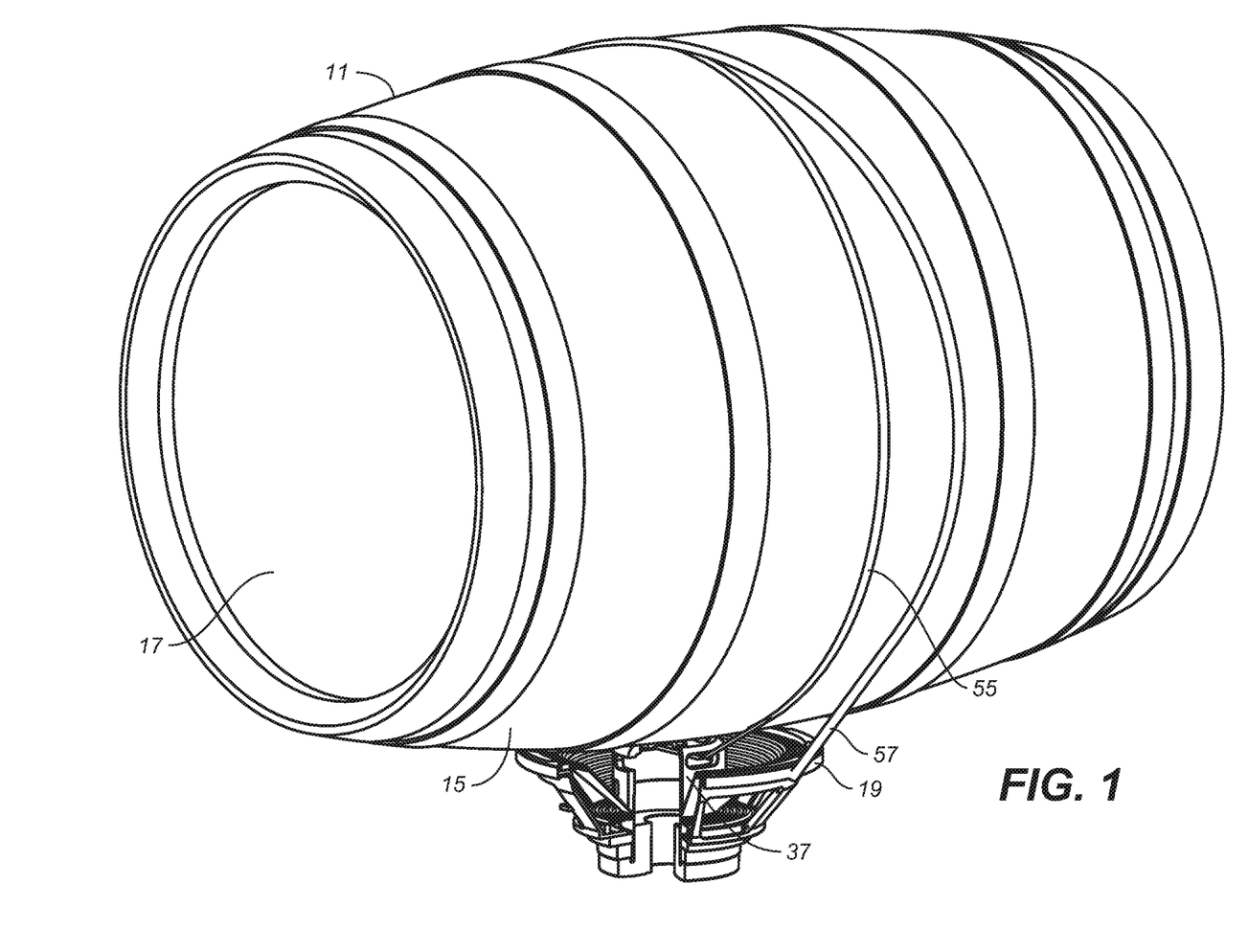
FIG. 1 is a top perspective view of a barrel for holding whisky, wine or other agitation responsive liquid with an apparatus in accordance with the invention, including a transducer, affixed to the barrel.
Figure 2:
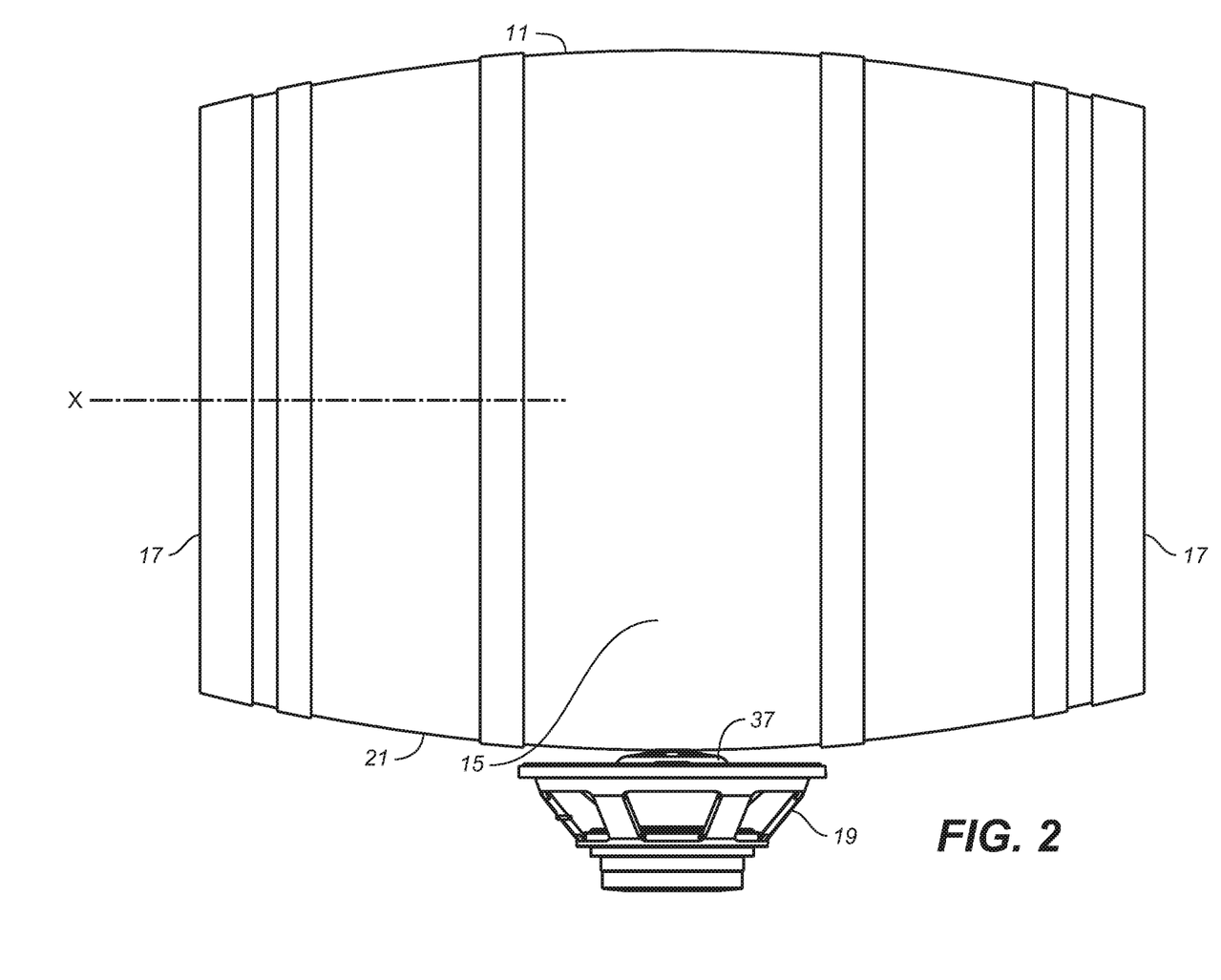
FIG. 2 is a side elevational view thereof.
Figure 3:
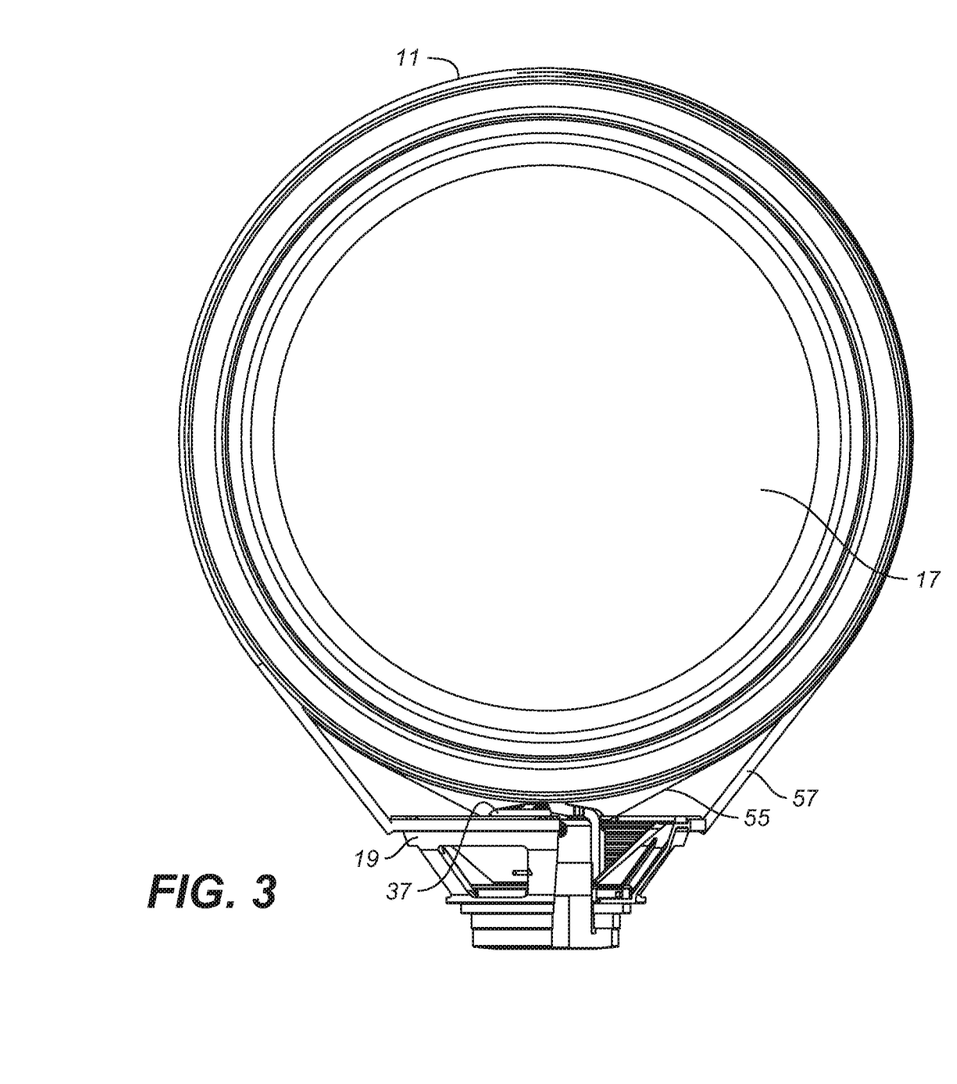
FIG. 3 is an end elevational view thereof.
Figure 4:
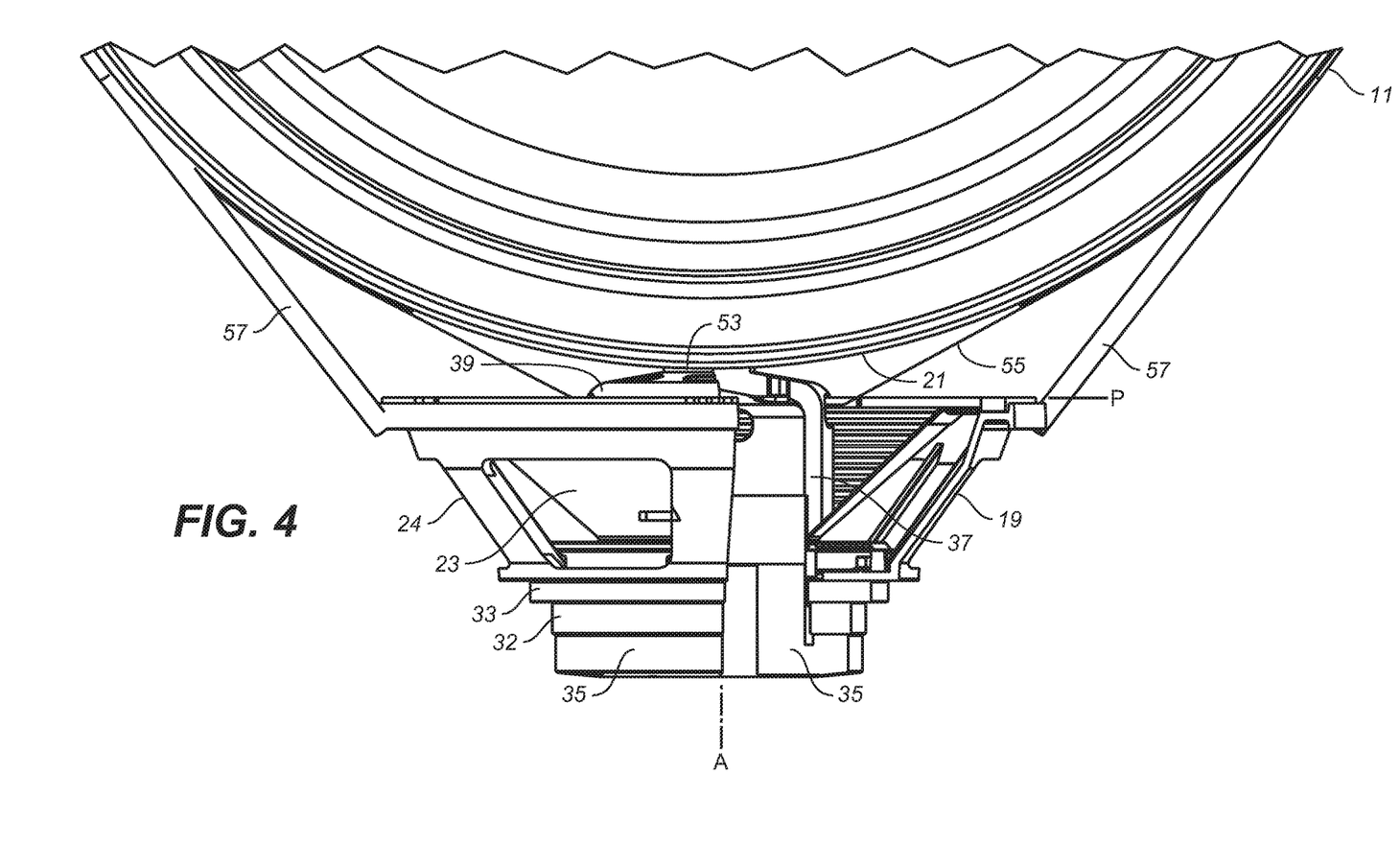
FIG. 4 is an enlarged cut-away view thereof showing the bottom of the barrel and the transducer of the apparatus in greater detail.

The central component of the apparatus and method used to produce vibration energy that can be transmitted to the responsive liquid stored in barrel 11 is the transducer 19. The transducer is held in a position facing the barrel sidewall and is preferably positioned at the bottom side 21 of the barrel between the barrels' end walls 17 such that the transducer axis, denoted by the letter "A" in FIG. 4, is in a vertical orientation. While the transducer could be positioned at other locations along or around the barrel, it is found that for a single transducer the shown location and vertical orientation of the transducer achieves the most efficient results in terms of modifying the in-barrel liquid, particularly where the liquid is whisky.

The transducer 19 illustrated in the drawings is a cone driver such as found in conventional loudspeakers and is capable of producing vibratory motion within the audio frequency range. However, it is contemplated that other forms of transducers could be used so long as they are capable of producing vibratory motion in the audio frequency band and particularly in the lower frequency regions of that band. The frequencies of particular interest are the resonant frequencies of the barrel, which will depend on the barrel size and shape as well as the barrel material, barrel wall thickness, and degree to which the barrel is filled; however, generally the frequencies of interest are anticipated to fall within a range of about 20 Hz to about 1000 Hz. It is at these resonant frequencies that, in accordance with the apparatus and method of the invention, vibratory motion can effectively and efficiently be transmitted to a responsive in-barrel liquid. This requires effective coupling of the vibratory motion of vibratory parts of the transducer to the barrel sidewall 15.

Figure 5:
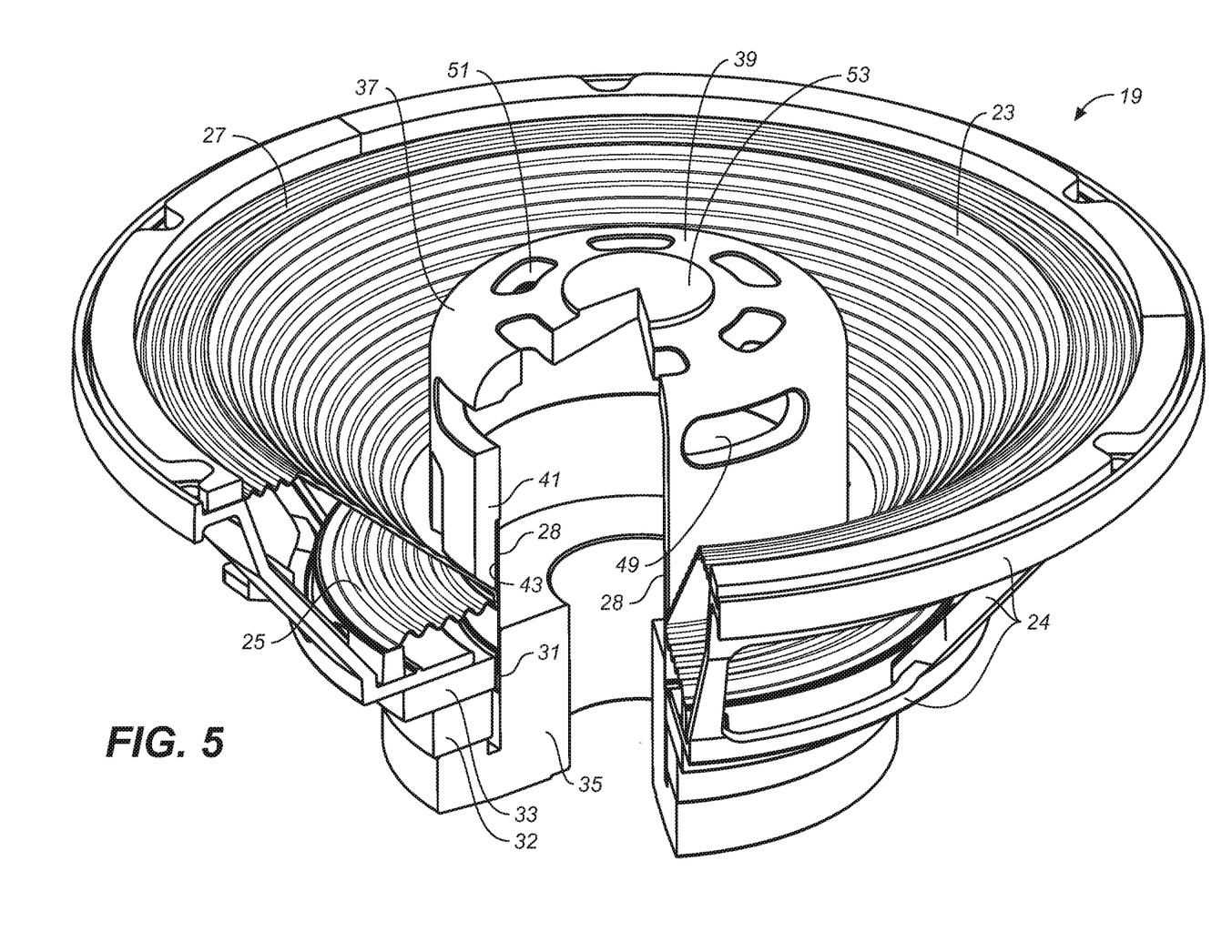
FIG. 5 is a partially cut-away perspective view of a transducer seen in FIGS. 1-4 and showing the coupler used to transmit vibration energy produced by the transducer to the wall of the barrel.
Figure 6:
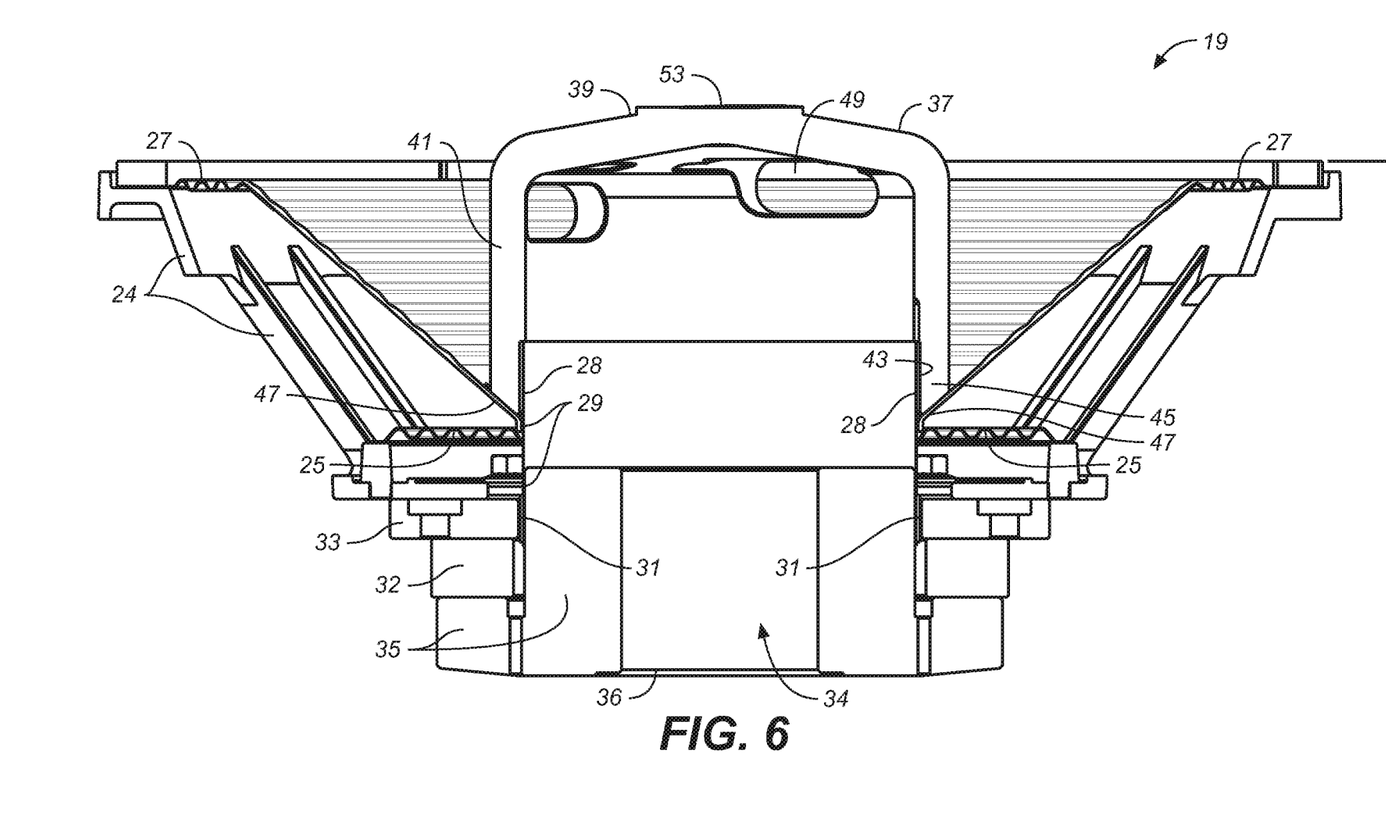
FIG. 6 is a cross-sectional view of the transducer shown in the foregoing figures.
Figure 6A:
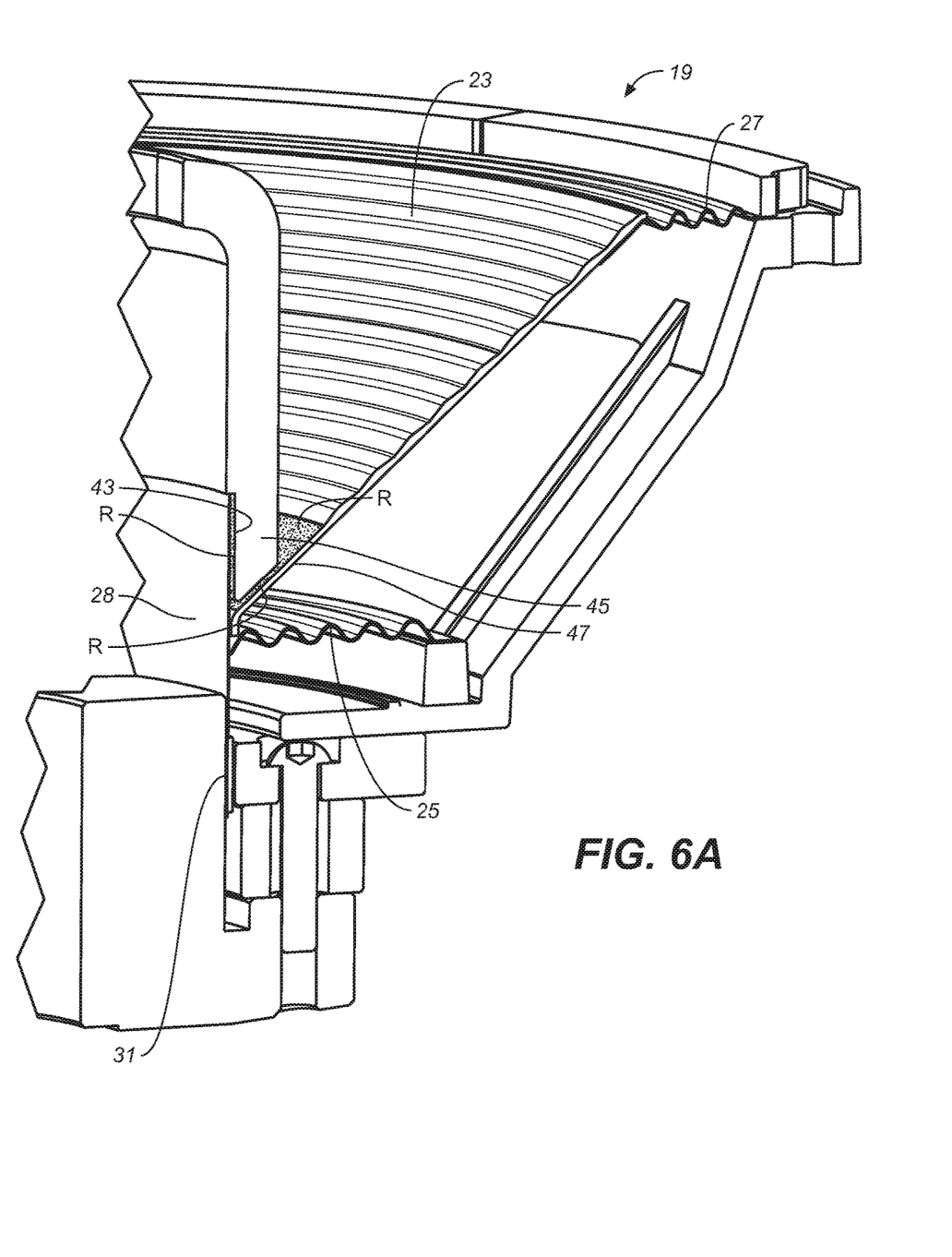
FIG. 6A is an enlarged fragmentary view thereof showing in greater detail how the base of the coupler is affixed to the voice coil assembly of the transducer.

The illustrated transducer 19, and mechanism for coupling the vibration energy produced by the transducer to and through the barrel wall, is now described in reference to FIGS. 5-6 and 6A. As mentioned, the illustrated transducer 19 is in the form of a cone driver, suitably a 12 inch cone driver, having a durable, but light weight paper cone diaphragm 23 suspended within a metal framework 24, called a "basket," by a bottom "spider" suspension 25 and a top "surround" suspension 27. The transducer further includes a voice coil assembly comprised of an elongated cylindrical former 29 and a voice coil 31 wound around the bottom of the former. (As described below, the voice coil assembly, which is of a conventional design for a cone driver, also typically includes a paper material, not shown, wrapped around the former above the voice coil to provide a better bonding surface for the driver diaphragm.) The cone diaphragm is affixed to the axial extension 28 of the cylindrical former for the voice coil, which is positioned in the magnetic gap of the magnetic circuit created by the assemblage of the magnet 32, the magnetically permeable top plate 33 and pole piece 35 (collectively referred to herein the "magnetic circuit assembly+). The pole piece is seen to have a center through-hole 34, the bottom of which can be covered by a screen, such as the screen 36 shown in FIG. 6.

In use, when an AC voltage input signal within the audio frequency range is applied to the driver it produces electrical current flow in the voice coil corresponding to the input signal, which in turn produces a vibratory motion in the entire voice coil assembly; the vibratory motion in the voice coil assembly in turn moves the cone diaphragm in a vibratory motion. In a normal cone driver the sole purpose of the vibratory motion of the diaphragm is to produce sound. Here, however, the vibratory motion of the voice coil assembly is harnessed for another purpose. By transferring it to the illustrated coupler 37, the vibration energy produced by this motion is coupled to the wall of a barrel containing a liquid that is responsive to vibration energy.

Referring to FIGS. 5, 6 and 6A, it is seen that the coupler 37, which is suitably fabricated of a rigid plastic material which exhibits low internal damping such as acrylic or ABS plastic, has a substantially closed forwardly projecting pusher end 39 which projects beyond the front plane of the transducer (denoted by the letter P in FIGS. 4 and 6) and a cylindrical sidewall 41 that extends rearwardly from this pusher end into the cone of the transducer. The coupler's cylindrical sidewall is seen to have a cylindrical recess 43 that extends upwardly on the inside of the coupler sidewall from the sidewall's base end 45 to receive the cylindrical extension 28 of voice coil former 29. The base end of the coupler sidewall is affixed to at least one and preferably both the bottom rim portion 47 of the driver's cone diaphragm and the cylindrical extension of voice coil former by a suitable adhesive, such as a urethane adhesive or an epoxy. The adhesive can be applied in the regions denoted by the letter "R" in FIG. 6A, that is, on the bottom rim portion 47 of the cone diaphragm 23 and on the outside surface of the cylindrical extension 28 of the voice coil former 29. It is again noted that the outside surface of the cylindrical extension 28 of the voice coil former 29 is typically covered with a paper material such as kraft paper for ease of bonding to this surface.

The coupler can further have cut-outs, such as denoted by numerals 49, 51, in the sidewall and pusher end of the coupler. These cut-outs act as air vents for venting air through the coupler during the transducer's vibratory motion; the cut-outs 49 in the coupler sidewall additionally provide accessible strap holes through which the coupler can be strapped to the barrel or other structure as hereinafter described.

The transducer 19 must be held in position next to the barrel sidewall such that the pusher end of the coupler which is attached to the cone of the transducer firmly contacts the sidewall 15 of the barrel 11. In the case of the coupler illustrated in FIGS. 5-6, barrel contact is made by a small raised forward contact surface 53 that concentrates the forces transmitted through the coupler to the barrel wall. (This contact is best shown in FIG. 4.) The strap 55 shown in FIGS. 1-4 serves as a tie-down means for holding the coupler in place. It is seen that this strap, which is suitably made of a stable low stretch material such as a polyester webbing, can be threaded through cut-outs 49 in the coupler sidewall and wrapped around the barrel and tightened so as to force the coupler against the sidewall of the barrel. What can be considered the back part of the transducer—the basket and magnet circuit assembly—is separately held in place by other tie-down means, which in this case is preferably a resilient tie-down means such as elastic cord 57 that compliantly secures the transducer in place. Using elastic tie-downs for the basket and magnet circuit assembly will allow the transducer to operate in a linear range and has been found to improve results.

Figure 7:
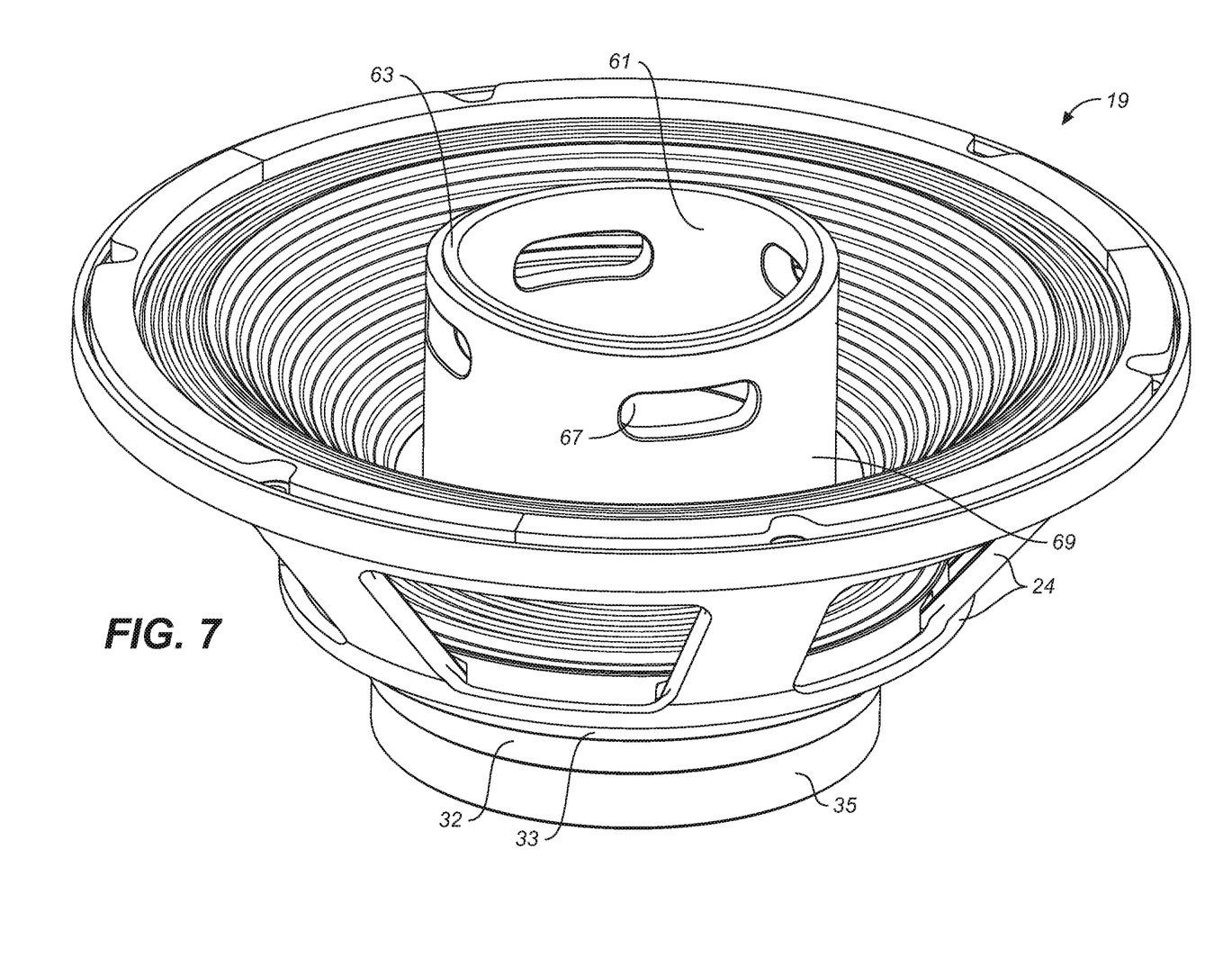
FIG. 7 is a perspective view of a transducer such as shown in FIGS. 5 and 6, showing an alternative configuration for the coupler device of the apparatus.

FIG. 7 shows a transducer 19 as previously described with an alternative design for the transducer coupler. In this case the transducer coupler 61 is in the form of a straight cylinder having a top rim 63 which acts as the coupler's pusher end. In this case the pusher end of the coupler is open instead of having a closed configuration as in the previously described embodiment. Cut-out openings 67 in the cylinder sidewall 69 are provided to receive one or more securement straps, such as the strap 55 shown in FIGS. 1-4, for holding the coupler against the barrel wall. Like the previously described coupler embodiment the pusher end formed by the coupler's top rim 63 projects beyond the front plane of the transducer such that only the pusher end of the coupler contacts the barrel sidewall when the transducer is mounted to the sidewall as above-described. Here, the contact is made at polar opposite sides of the coupler's top rim 63.

The embodiment of the coupler shown in FIG. 7 can also suitably be fabricated of a rigid plastic material and is similarly attached at its base end to the transducer's cone diaphragm and/or the voice coil former of the transducer's voice coil assembly. The coupler of this embodiments more easily fabricated and is more easily strapped to the barrel. The sidewall of the barrel could be modified to increase the surface contact area between the pusher end of the coupler and the barrel wall; however, this is not required.

Figure 8:
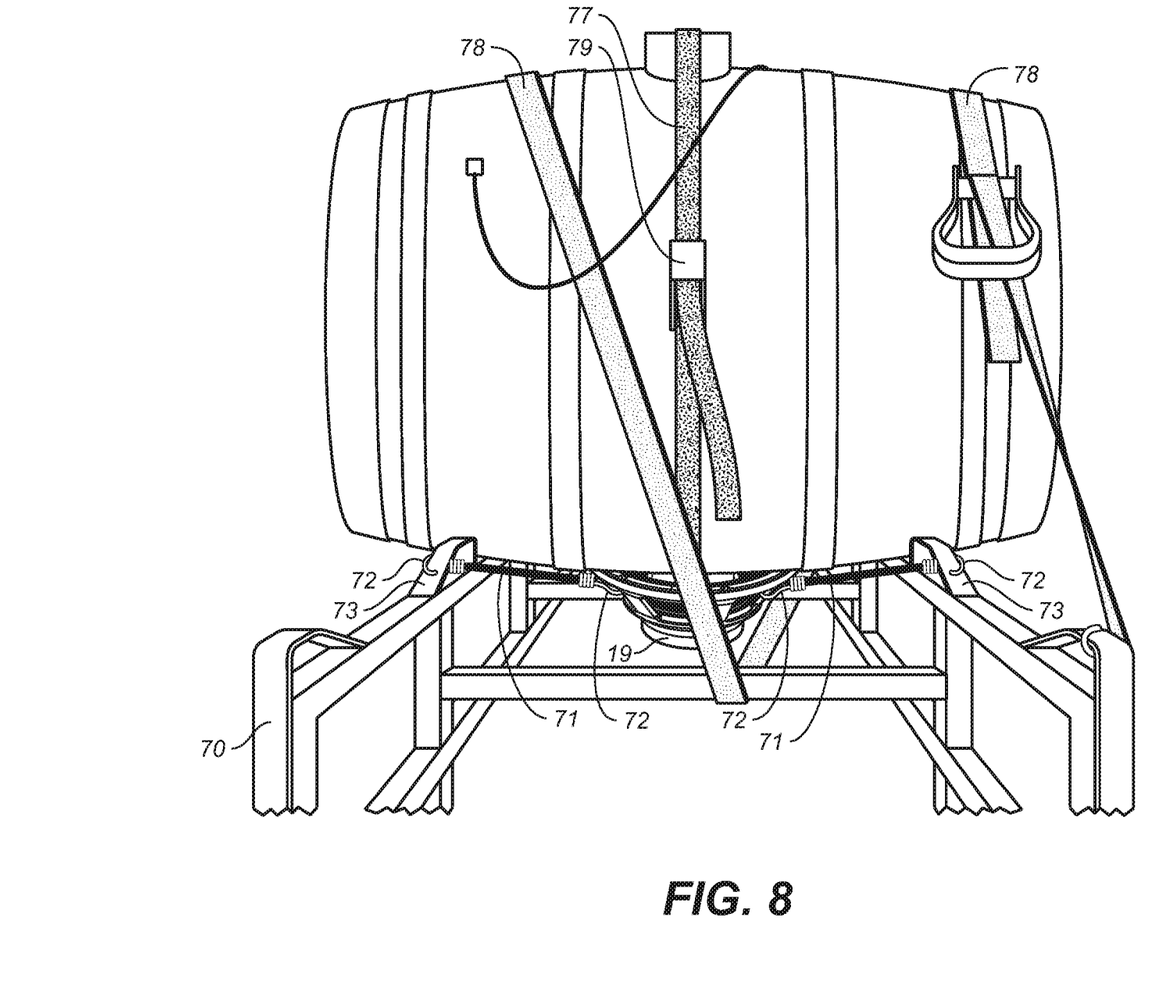
FIG. 8 shows the barrel illustrated in FIGS. 1-4 cradled in a support stand and an alternative method of securing parts of the transducers in place on the barrel.

FIG. 8 shows a whisky barrel 11a, similar to the barrel 11 shown in FIG. 1-4, supported on a barrel support stand 70, and additionally shows a transducer 19 coupled to the barrel wall as above-described. The barrel support stand is configured to support the barrel in its preferred horizontal position. However, instead of being tied directly to the barrel as shown in FIGS. 1-4, the transducer basket and magnetic circuit assembly ("TBMCA") is resiliently tied to the barrel support stand by a resilient tie-down means such as the bungee cords 71 shown in FIG. 8. Suitably, there would be two bungee cords on each side of the barrel with the hook ends 72 of the bungee cords hooked onto the transducer basket at one end and a suitable part of the support stand at the other end, e.g. onto the barrel stay projection 73 of the barrel support stand frame. The shown strap 77 with tightening clamp 79 threads through the above-described cut-outs in the coupler sidewall to strap the transducer coupler to the barrel wall as also above-described. The additional adjustable strap 78, which also wraps around the barrel, is provided for tying the barrel to the support stand. In both cases the straps are suitably made of a stable low-stretch material and are tightly tensioned around the barrel.

The different ways of tying the transducer to the barrel wall described above (using bungee cords to tie wrapped around the barrel as shown in FIGS. or tied to a stationary frame), result in the basket and magnetic circuit assembly of the transducer being held in place resiliently rather than in a fixed stationary position as would normally be the case where the transducer is mounted to a baffle wall of a loudspeaker enclosure. The resilient tie-down means for the TBMCA in effect creates a dual-moving-mass-on-a-spring system. The primary moving mass is the TBMCA itself, and this mass is coupled via a spring (the diaphragm suspension) to a second moving mass comprised of the voice coil assembly, coupler and barrel ("VCB") (the diaphragm is essentially massless). It is noted that where the TBMCA is tied directly to the barrel, the TBMCA mass is also coupled to the VCB mass via a secondary spring (the resilient tie-downs), thereby providing a secondary path for the vibration energy of the TCBMA to be coupled to the barrel (actually the VCB mass) and thus to the in-barrel liquid. However, it is believed that in this direct-tie configuration the TCBMA vibration energy reaching the in-barrel liquid via this secondary path will be relatively small and that most of the TCBMA vibration energy transmitted to the in-barrel liquid by the VCB mass with be transmitted via the diaphragm suspension through the primary path of the coupler.

The apparatuses described above can advantageously be used to excite resonances in the barrel (or other container) within the audio frequency ranges of interest, which in most cases will occur below 1000 Hz. By driving the transducer at or close to these resonant frequencies the vibration energy produced by the transducer can be efficiently transmitted to the in-barrel liquid. At these frequencies the barrel wall is effectively turned into a substantially massless diaphragm that puts the vibration energy into the in-barrel liquid for agitating the liquid to, for example, accelerate aging of a spirit contained within the barrel. The signal content for driving the transducer secured to the barrel will need to be optimized to the barrel resonant frequencies. This optimization can be done either manually or with a feedback loop.

The manual approach for optimizing the signal content involves an open loop system where sensors (e.g. accelerometers or hydrophone) deployed in and/or on the barrel are used manually to measure "energy spectrum" and/or "transfer function" (frequency response) in order to identify resonant frequencies of the barrel. Those measurements can be performed with single or dual channel FFT spectrum analyzers, but other analysis methods could also be used. As part of this manual tuning process, boost equalization can be applied to the audio path at the resonant frequencies so that the incoming signals can best excite the resonances and maximize the vibration. This manual process could be repeated at defined time intervals (days/weeks/months) throughout the aging process to adjust for changes in resonance if they were to drift.

Figure 9:
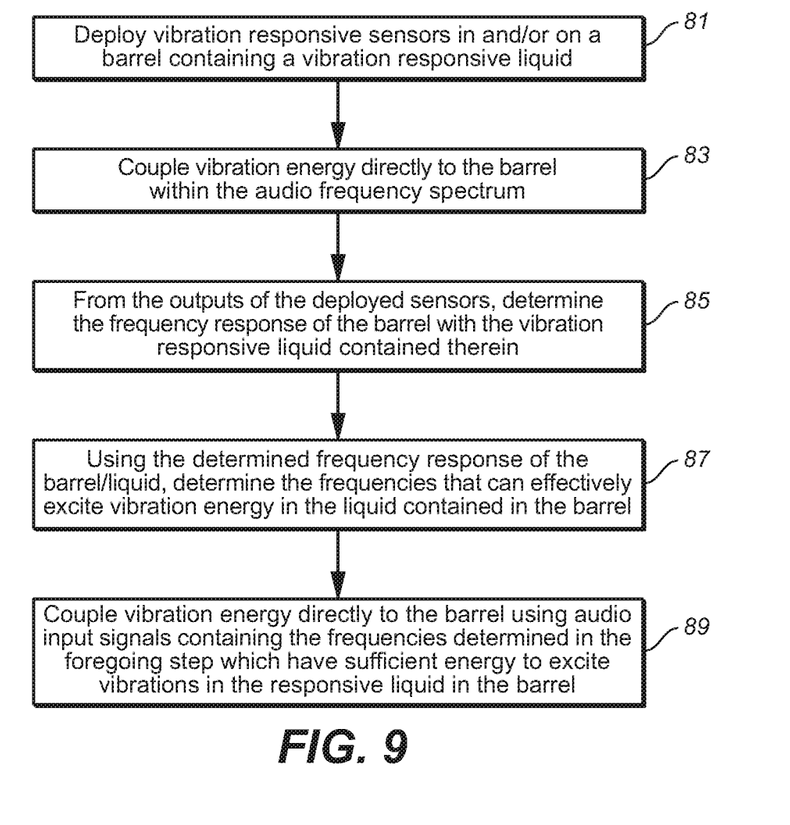
FIG. 9 is a flow chart illustrating the steps of a method of determining the frequency response and thereby resonances of barrel containing a liquid and advantageously using the determined resonances to excite vibrations in the liquid contained in the barrel.

The above-described manual approach for optimizing the signal content is reflected in FIG. 9, which is a flow chart illustrating the basic steps of producing resonances in a barrel for agitating a responsive liquid in the barrel to sufficient degree to produce a desired effect such as accelerating the aging of the whisky. As a first step, vibration sensors such as above-described are deployed to measure vibrations (accelerations) in the barrel wall and also preferably vibrations (sound pressure) in the liquid contained in the barrel. This step is represented by block 81. Next, vibration energy is coupled directly to the barrel within the audio frequency spectrum (block 83). The outputs of the deployed sensors are then used to determine the frequency response of the barrel with the vibration responsive liquid contained in the barrel (block 85). Using the determined frequency response of the barrel and liquid, the frequencies that can effectively excite vibration energy (agitation) in the liquid contained in the barrel are determined (block 87). In the next step of the method (represented by block 89) vibration energy is coupled directly to the barrel (such as by the apparatus above-described) using audio input signals containing the frequencies determined in the foregoing step (block 87). At the determined resonant frequencies the vibration energy needs to be sufficient to excite effective vibrations in the liquid contained in the barrel. The direct coupling of the acoustic energy to the barrel provides for efficient coupling of vibration energy to the liquid in the barrel, meaning less power is required to effectively agitate the barrel liquid at these resonant frequencies as compared to blasting the barrel with sound.

Figure 10:
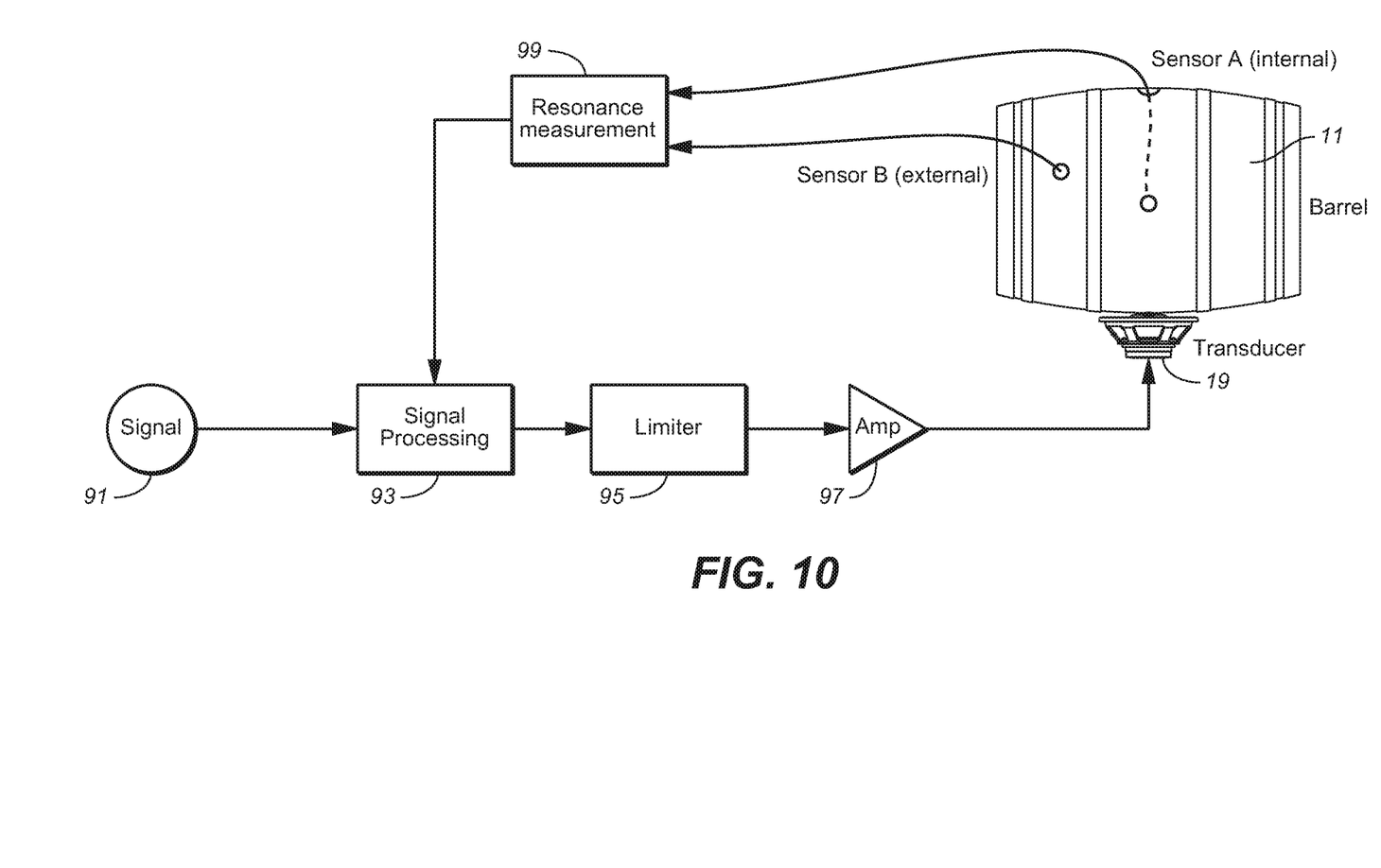
FIG. 10 is a diagrammatic illustration of an electronic circuit for driving and controlling the output of the transducer shown in the foregoing figures.

FIG. 10 illustrates a simple system for optimizing the signal content inputted to the transducer using a feedback loop. Shown is a signal input 91 and a signal path to the transducer 19, which includes a signal processor 93, a limiter 95 and an amplifier 97. The output of the amplifier is connected to transducer 19 which can be secured to barrel 11 in the manner above-described or to a stationary support stand as illustrated in FIG. 8. A sensor denoted by the letter A is deployed in the barrel to measure sound pressure in the in-barrel liquid induced by vibration from the transducer. An additional sensor denoted by the letter B is attached to the outside of the barrel wall to measure the accelerations in the wall. The output of the sensors is used to detect resonances as indicated by block 99 and this information is fed back to the signal processor 93. Different types of feedback systems are contemplated which will be now briefly described.

Classical Negative Feedback System. In this system the sensor output is fed back to a linear controller (such as PID or possibly MIMO controller) to form negative feedback. Here, classical control theory applies. An error signal is generated and used to drive the amplifier and transducer(s). As with typical negative feedback systems the signal at the sensor is made to match the signal at the input by virtue of loop gain. In this case the acceleration (sensed by the accelerometer) would match the electrical audio input. The electrical input would be an external audio signal and possibly also an internal audio signal mixed with it. Internal audio signals might for example be sinewaves set at the known resonant frequencies in order to make the acceleration near constant magnitude thereby generating optimal vibration and fluid agitation.

In classical negative feedback, the degree to which the sensor signal matches the input will depend on the amount of loop-gain. Loop-gain is always limited in order to achieve stability. Stability of a negative feedback system requires that there is no positive feedback at frequencies where the loop gain is 1 or greater. Since phase shift increases with increasing frequency due to delay between the actuator and sensor ("the plant") a roll-off is often applied in the loop in the form of a low pass filter, i.e. dominant pole to assure the gain is <1 before the phase reaches 180°. The roll-off itself produces phase shift too so it is typically limited to 1st order (−6 dB/oct). Loop gain at frequencies below this unity gain frequency can typically only increase (with decreasing frequency) 6 dB/oct.

Example. In a barrel containing whisky, phase shift from the transducer was measured by an accelerometer and a phase shift observed that reached 180 degrees by 300 Hz, even when the accelerometer was placed very close to the driver. As a result, a large amount of loop-gain could not be applied since the gain must be <1 by 200-300 Hz. To keep the feedback loop stable, a maximum of 20 dB loop gain at 25 Hz with it sloping to 0 dB loop gain at 250 Hz would need to be applied. The disadvantage with this approach is that it results in a relatively weak tracking of acceleration.

Automated Measurement & Monitoring with Automated Adjustment. In this embodiment the accelerometer sensor is not in a negative feedback loop but instead its signal is fed into a system that automatically measures the spectrum, transfer function, or other properties to make decisions about equalization of the audio feeding the amplifier and actuator. This system could take on a variety of forms. It could for example adjust equalization and overall gain in the audio, driving the amplifier to optimize or maximize acceleration at resonant frequencies. It could also adjust limiters or non-linear signal processing or activate internal audio signals such as noise or sine waves, again to optimize acceleration or vibration.

Positive Feedback with Controlled Instability. The concept of this system is that, rather than negative feedback, positive feedback is implemented such that the loop is held at the verge of oscillation or in weak oscillation at one or more of the resonant frequencies.

While the various embodiments of the invention have been described in the foregoing specification in considerable detail, it is not intended that the invention be limited to the described embodiments or the particular details of the described embodiments. It will be appreciated that variations on the described embodiments are possible without departing from the scope and spirit of the invention.

What we claim is:

1. An apparatus for modifying a liquid held in a liquid container having container walls wherein the liquid is responsive to vibration energy within the audio frequency range that is introduced into the liquid, said apparatus comprising:
   a transducer having a voice coil assembly for producing vibration energy within the audio frequency range in response to an audio signal input,
   a coupler affixed to the voice coil assembly of the transducer such that vibration energy produced by the voice coil assembly of the transducer in the audio frequency range transfers to the coupler, the coupler being configured to transmit vibration energy within the audio frequency range that is produced by the voice coil assembly of the transducer in response to an audio signal input to the wall of the container when the transducer is held next to the wall of the container.

2. The apparatus of claim 1 wherein the coupler is configured to transmit vibration energy within the audio frequency range that is produced by the transducer to the wall of the container via direct contact with the wall of the container.

3. The apparatus of claim 1 wherein the transducer has a defined front plane and the coupler has a pusher end that extends beyond the front plane of the transducer, and wherein vibration energy within the audio frequency range that is produced by the transducer in response to an audio signal input is transmitted to the wall of the container through direct contact of the pusher end of the coupler to the container wall.

4. The apparatus of claim 1 wherein the coupler has a forwardly projecting pusher end configured to contact the wall of the container, and a base end affixed to the voice coil assembly of the transducer.

5. The apparatus of claim 1 further comprising tie-down means for holding the coupler that is affixed to the voice coil assembly of the transducer against a wall of the liquid container such that the coupler transmits vibration energy within the audio frequency range produced by the voice coil assembly of the transducer to the container wall and thence to the responsive liquid in the container.

6. The apparatus of claim 5 wherein the tie-down means for holding the coupler to the wall of the container comprises cut-outs in the coupler for receiving tie-down straps or cords that wrap around the container.

7. The apparatus of claim 5 wherein the transducer includes a stationary back part to which the coupler is not affixed, and wherein the tie-down means includes means for resiliently holding the back part of the transducer in place relative to the coupler and container.

8. The apparatus of claim 7 wherein the back part of the transducer is resiliently held directly to the container.

9. An apparatus for modifying a liquid held in a liquid container having container walls wherein the liquid is responsive to vibration energy within the audio frequency range that is introduced into the liquid, said apparatus comprising:
   a transducer having a voice coil assembly for producing vibration energy within the audio frequency range in response to a signal input, said transducer having a defined front plane,
   a coupler having a base end and a pusher end extending beyond the front plane of the transducer, the base end of the coupler being affixed to the voice coil assembly of the transducer such that vibration energy within the audio frequency range produced by voice coil assembly of the transducer is transferred to the coupler, and the pusher end of the coupler being configured to contact and push against the wall of the liquid container when the transducer is held against a wall of the container.

10. The apparatus of claim 9 wherein the coupler includes cut-outs for receiving tie-down straps or cords that wrap around the container for holding the pusher end of the coupler in contact with the container wall.

11. The apparatus of claim 9 wherein the coupler includes a plurality of cut-outs for air-holes and for receiving tie-down straps or cords that wrap around the container for holding the pusher end of the coupler in contact with the container wall.

12. The apparatus of claim 9 wherein the coupler has a cylindrical side wall extending from the base end of the coupler to the pusher end of the coupler.

13. The apparatus of claim 9 wherein the pusher end of the coupler has a substantially closed pusher end having a raised forward contact surface for contacting the wall of the container.

14. The apparatus of claim 9 wherein the pusher end of the coupler is open and is formed by a forward top rim of the coupler wherein the forward top rim of the coupler provides contact between the coupler and the wall of the container.

15. The apparatus of claim 9 wherein the coupler has a cylindrical form.

16. An apparatus for modifying a liquid held in a liquid container having container walls wherein the liquid is responsive to vibration energy introduced into the liquid and wherein the container has determinable resonant frequencies in the audio frequency range, said apparatus comprising:
   a transducer having a voice coil assembly for producing vibration energy within the audio frequency range in response to an audio signal input including at the determined resonant frequencies of the container, said transducer having a defined front plane,
   a cylindrical coupler having a base end and a pusher end extending beyond the front plane of the transducer, the base end of the coupler being affixed to the voice coil assembly of the transducer such that vibration energy produced by the voice coil assembly within the audio frequency range is transferred to the coupler, and the pusher end of the coupler being configured to contact and push against the wall of the liquid container, and
   tie-down means for holding the transducer next to a wall of the liquid container such that the pusher end of the coupler affixed to the transducer pushes against the wall of the liquid container, wherein vibration energy produced by the transducer at a resonant frequency of the liquid container is transmitted through the container wall to the responsive liquid in the container.

17. The apparatus of claim 16 wherein the tie-down means includes a plurality of cut-outs for air holes and tie-down straps or cords that wrap around the container for holding the pusher end of the coupler in contact with the container wall.

18. The apparatus of claim 17 wherein the transducer includes a stationary back part to which the coupler is not affixed, and wherein the tie-down means includes means for resiliently holding the stationary back part of the transducer directly to the container.

* * * * *